106. COMPOSITIONS,
COATING OR PLASTIC
89

Examiner

Patented Apr. 24, 1945

2,374,562

UNITED STATES PATENT OFFICE 2,374,562

TREATMENT OF HYDRAULIC CEMENT COMPOSITIONS

Calvin A. Owens, Los Angeles, Calif.

No Drawing. Application March 9, 1939,
Serial No. 260,743

12 Claims. (Cl. 106—89)

The present invention pertains to a reagent and methods of using the same in the treatment of new or old cement compositions. The invention also relates to a gauging solution for use in mixing with hydraulic cement, alone or with suitable aggregate, whereby soluble constituents of cement are rendered insoluble. The hydraulic cement compositions made by the use of the reagent of this invention are characterized by great impermeability and resistance to liquids, reduced porosity, increased hardness and strength (particularly early strength), ability to protect reinforcing steel and iron from corrosion, and other desirable properties which permit the compositions to be advantageously employed for a great variety of purposes. The invention also pertains to means and conditions of treating hydraulic cement compositions during mixing and also after such compositions have become self-sustaining, and to the resulting cementitious bodies.

Hydraulic cements, generally known as Portland cements, contain a number of silicates and aluminates, some of which involve calcium, this being generally referred to as lime. Part of this calcium or lime is combined with the silica, alumina and other components, in relatively stable form, while another part may be readily hydrolyzable or in the form of oxide, hydroxide or carbonate, these rather reactive and readily hydrolyzable portions being the source of what is termed free or available lime. The permeability of hydraulic cement compositions and their susceptibility to the action of water are believed to be due, in part at least, to the presence of free lime or soluble constituents which are readily leached out of the cementitious bodies, resulting in a porous mass which can be disrupted readily by ice formation, growth of salt and sulfate crystals in such pores, etc.

Furthermore, porosity or permeability of the compositions permits the water to gain access to whatever steel, iron or other metal is contained within or covered by the hydraulic cement composition, the moisture, together with its contained salts, forming an electrolyte which accelerates and renders possible corrosion of such steel, iron or other metal. The corrosion in turn results in the formation of oxides and an increase in volume which causes spalling and further exposure of the metals.

Hydraulic cement compositions are employed for a great variety of purposes and properties such as resistance to sea water, impermeability, etc., are often of greater importance than the strength of the composition. The present invention is primarily directed to processes of preparing hydraulic cement compositions in such manner that the resulting cementitious bodies are relatively impervious to the passage of water and other liquids, such increase in impermeability being accomplished without any sacrifice in the strength of the concrete, but, on the other hand, generally resulting in an increase in tensile and compressive strength and greatly extended effective life.

In the past, water repellent or fatty substances such as palmitates, stearates, oils, etc., have been added to freshly mixed concrete and mortar to render the final product more water resistant. Finely divided materials, such as diatomaceous earth, have also been added as void fillers. These substances are relatively insoluble solids. Some difficulty is encountered in mixing them with the mortar or concrete to produce uniform distribution throughout the mass and in most instances they do not react with the cement, are inert, have a tendency to reduce the strength of the finished set mortar or concrete and require changes in normal water:cement ratios.

The present invention is based upon the discovery that by making and using a water solution of certain metallic compounds, as gauging or mixing water, insoluble compounds can be formed from the socalled free or readily available lime throughout the cementitious bodies. These insoluble reaction products effectively fill voids in the mortar or concrete, assist in cementing the various particles together, reduce the solubility of the finished cementitious body and render it highly resistant to the passage of liquids. This increased impermeability results in hydraulic cement compositions which effectively protect steel, iron or other metal contained therein or embraced thereby from corrosion. In addition, the resulting cementitious bodies have desirable shrinkage and expansion characteristics, form a more intimate and stronger bond with metal than normal hydraulic cement compositions, and have an increased density and homogeneity.

It has further been discovered that tanks and other containers for liquids may be made from an hydraulic cement composition treated in accordance with this invention, such tanks and containers being readily constructed and being capable of holding oil, water and aqueous media without leakage, seepage or other losses.

More specifically stated, the present invention relates to a process of dispensing a water-soluble compound of chromium, molybdenum, tungsten or vanadium in mixing water, and in employing such solution in the mixing of hydraulic cement compositions. Chromic anhydride is at present the preferred reagent for reasons of economy.

An object of this invention is to disclose a novel solution adapted for use in the mixing of various hydraulic cement mixes.

Another object is to provide reagents and concentrations thereof, in aqueous solutions, for mixing with or treating hydraulic cement compositions.

A further object is to disclose and provide a method of converting relatively soluble constituents of hydraulic cements into relatively insoluble compounds which are retained within compositions or bodies produced from hydraulic cements.

An object, also, is to provide means and methods of rendering innocuous soluble calcium constituents of hydraulic cements.

Another object is to provide a gauging solution containing constituents in solution therein, which constituents are capable of being converted into useful insoluble compounds in the presence of hydraulic cements.

A further object is to disclose and provide means and methods of producing mortars, concretes and other cementitious compositions from hydraulic cements, which compositions are characterized by high impermeability, reduced porosity and increased resistance to the passage of liquids therethrough.

A still further object is to provide hydraulic cement compositions which are stronger, bond more readily to steel and iron, protect such metals from corrosion, and exhibit smaller volumetric and linear changes than normal cement compositions.

Other objects, advantages, results, characteristics, uses and adaptations of the invention will be made evident to those skilled in the art from the description given herein.

In the past, cementitious compositions were made by adding water, from any source, to hydraulic cement alone or together with aggregate (sand, rock, gravel, cinders, slag or any other solid or solids) and mixing, whereupon the mixture was then cast, poured, troweled, rodded or otherwise caused to assume a desired form or finish. Strength develops in the mass during a curing period and usually care is taken to prevent evaporation of mixing water from the mass during curing by maintaining the mass under humid conditions or by covering with wetted burlap or by flooding, application of seal coats, etc. It is believed that crystallization of various calcium and aluminum silicates takes place during setting, curing and aging of cement compositions, water being an integral and important part of many of the compounds formed.

In accordance with the present invention, the mixing or gauging water comprises a solution containing a water-soluble compound of chromium, molybdenum, tungsten or vanadium. Compounds employed should not be strongly basic nor strongly acidic and should not give rise to the formation of calcium compounds having large molecular volume upon crystallization with water, such as calcium sulfate, for example. Chromic anhydride, manganese trioxide, molybdic acid and ammonium salts of molybdenum, vanadium and tungsten are examples of materials which can be employed. Chromic anhydride is preferred and when added to mixing water in amount ranging from about 0.2% to about 4% by weight of water, has been found to give splendid results. Ordinarily, 0.3% or 0.5% to 1.0% is ample, larger amounts, say 3%, tending to give high early strengths but to also accelerate the set of the composition somewhat. The use of solutions having a concentration appreciably above 4% or 5%, in gauging water of normal hydraulic cement, results in compositions having a low strength. It is believed that chromic anhydride ($CrO_3$) furnishes ions of $CrO_4$, $Cr_2O_7$, $Cr_3O_{10}$ and $Cr_4O_{13}$ in the solution, the first mentioned being most common. Technical grades of chromic anhydride can be used. Chromic anhydride is often referred to as chromic acid, but irrespective of the name used, it is desirable that the substance employed in this process be able to dissolve in water to furnish, in part at least, the ions which are furnished by the addition of $CrO_3$ to water.

Various methods of making up the solutions may be employed. Concentrated solutions of the anhydride can be made and then added to the mix water in desired proportion, as, for example, by adding the same to a flowing stream of mixing water, by proportioning pumps, ejectors or injectors, proportioning feeders operating on a Venturi principle, etc., devices adapted for these purposes being well known in the arts. The concentration of reagent used in the solution will depend somewhat upon the character of the hydraulic cement being employed and the results sought to be attained. Higher concentrations can be used with cements high in free lime than with cements low in free lime. The total amount of solution employed will vary with the proportion and amount of hydraulic cement in the cementitious mixture being prepared, the variation following in general the well known water:cement ratios now employed. Ordinarily, 6–7 gallons of solution per sack of cement are used in making up mortar and concrete mixes. No changes in mixing times or proportioning of aggregates need be made. No changes in methods of trowelling, rodding, vibrating or pouring are required.

Since the chemistry of Portland cement is subject to conflicting theories and the transformations and crystallizations of the various silicates and aluminates contained in Portland cement have been the basis of many conflicting and even contradictory statements, the reaction which takes place as a result of the process of this invention will not be definitely stated. From investigations which have been carried out, however, it appears that the soluble metal compounds used in the gauging water are converted into insoluble compounds and precipitated throughout the cementitious body. When chromic anhydride is employed, it appears that a major proportion thereof is converted into calcium chromate. As first formed, this compound appears to be $$CaCrO_4.2H_2O$$

but during the curing period the compound loses at least a part of its water of crystallization, the water being liberated to the complex silicates and aluminates which are formed and which exert a greater affinity for the water. Water, required for the important crystallizing processes, is thus supplied by the chromium compounds when and as the water is needed, and such compounds are rendered insoluble. Soluble lime is concurrently rendered insoluble and innocuous. It also appears that a portion of the reagent is converted into chromium hydroxide $Cr(OH)_3$ and a minor portion is combined with alkalies, resulting in alkali chromates. These various reaction products appear to increase the plasticity or workability of the cement composition and after the composition has been poured, cast or molded, the gelatinous or colloidal form of the precipitated material effectively seals the pores of the cementitious body, retarding evaporation of gauging water therefrom and thereby permitting the setting and hardening of the cement to take place under most advantageous conditions. The increase in strength which obtains as a result of the process of this invention is probably due not only to the cementing action of the insoluble compounds which are precipitated but also due to the fact that the normal hydration and crystallization of the cement would now take place over a prolonged period of time in the presence of gauging water which is retained within the body of cement mixture and does not evaporate from the surfaces thereof with as great rapidity as is usually the case. As a result of the sealing or isolating action of the precipitated insoluble compounds, cementitious bodies made in accordance with this invention need not be sprayed or maintained under wet covers with the same care or to the same extent as in the past. As cementitious compositions of this invention dry out, and water migrates to the surfaces to evaporate, it is believed that such water deposits insoluble compounds in the capillaries and thereby decreases the porosity and permeability of the composition.

It has been definitely shown that ferric compounds, present in Portland cement, are converted into ferrous condition by the use of the gauging solutions of this invention. No all effects, such as cracking, checking, spalling, undue expansion, or the like, as a result of the process of this invention, can be observed in neat cement pats or bars, even when subjected to 300 pounds steam for appreciable lengths of time.

Tests conducted with mortars (1 part Portland cement to 3 parts of sand, for example) definitely show that the resulting mortar is stronger (in terms of tensile, compression and breaking strengths) and has a remarkably greater resistance to passage of water.

1:3 mortars showed the following crushing strengths in seven days:

| | Lbs. per square inch |
|---|---|
| Plain | 2,100 |
| 0.5% | 2,400 |
| 1.0% | 3,300 |
| 3.0% | 4,000 |

Ordinary 1:3 mortar in a 1" specimen will pass from 30 cc. to 10 cc. of water per hour at a pressure of about 30 pounds per square inch while specimens of 1:3 mortar made by the use of the reagents referred to did not pass water even when a water pressure of above 110 pounds per square inch was imposed upon the test specimens for days at a time. The total water absorption of treated mortar is only about 10% of the absorption exhibited by untreated mortar. These and similar results indicate the great utility of the process in preparing cementitious materials for use in tunnels, foundations, pipe, tanks, piling, caissons, dams and wherever it is desired to prevent the passage of liquids.

Concrete made by using 256 pounds of sand and 280 pounds of #3 and #4 rock to 1 sack of cement showed an average compressive strength of 1563 pounds per square inch in seven days whereas the use of a 0.5% solution of chromic anhydride as gauging water resulted in an average of 1711 pounds per square inch at seven days, all mixes showing a 6" slump and being made with 7.25 gallons of water or solution per sack of cement. The results were remarkably uniform. Similar increases in strength are obtained at other ages.

The hydraulic cement compositions show that lower expansion and contraction effects are obtained during setting, curing and drying, that the temperatures within the compositions are not quite as high as those developed in normal compositions and that these new compositions adhere more tenaciously to steel, iron and other metals. As a result, the cementitious compositions made with the reagents of this invention can be advantageously used in large mats, highways and wherever cracking problems are ordinarily encountered or wherever it is desired to insure thorough bond between metal and cementitious compositions, as in oil well cementing, lining or coating of metal pipe, etc. After drying, the compositions effectively protect metal to which they have been applied, against corrosion.

The increased density of the compositions also adapt them for use in decorative units such as slabs, panels, floorings, etc., which may be ground and polished. The decreased porosity of the compositions also enhances the fire-proofing and insulating characteristics and uses of these compositions.

The gauging solutions and the methods of this invention have been found applicable to various types of hydraulic cements. The preferred proportions given hereinabove are particularly directed to most desirable proportions for use with normal Portland cement such as, for example, those which have a total lime (CaO) content of between about 58% and 62%. It has been found, however, that various types of hydraulic cements will react with the gauging solutions in substantially the same manner although in some instances the proportion of reagent added to the gauging water may have to be changed in order to produce optimum results.

Quick-setting cements, such as cements high in alumina content, do not require as large proportions of reagent whereas cements having a higher content of lime may desirably combine with larger proportions of reagent than those specifically referred to. It is to be remembered that within the ranges given the setting time of normal Portland cements is accelerated a small amount, if at all, but the use of higher concentrations of reagent in the mixing water has a tendency to accelerate the setting time more appreciably. If, therefore, the particular use which is to be made of the cementitious mixture makes it desirable to accelerate the setting time of the mixture, then larger proportions of reagent can be employed in the gauging water to good advantage. In the event strength is not important, the gauging solution can be made with as much as 12% or even 15% of chromium anhydride. In view of the differences in uses and the difference in composition of the hydraulic cement itself, the concentrations and proportions herein given are simply indicative and can be modified in accordance with the uses and characteristics of the cement and the reactivity of the mineralizing reagent employed.

Those skilled in the art will appreciate from the above description that numerous changes and modifications can be made in the use of the invention and all such changes, modifications, adaptations and uses are embraced by this invention.

I claim:

1. In a method of preparing hydraulic cement compositions, the steps of: adding from about 0.2% to 1% of chromic anhydride to mixing water, by weight thereof, and gauging an hydraulic cement composition therewith.

2. In a method of preparing gauging water for hydraulic cement compositions, the steps of dissolving in water from about 0.2% to 1% by weight of chromic anhydride.

3. In a method of producing hydraulic cement compositions of low permeability, the step of introducing chromic anhydride into the gauging water of an hydraulic cement comopsition, said chromic anhydride being introduced in quantities of from about 0.5% to 1.0% by weight of such water.

4. In a method of producing hydraulic cement compositions, the step of introducing a water-soluble reagent from the group consisting of chromic anhydride, manganese trioxide, molybdic acid and substantially neutral water soluble salts of molybdenum, manganese, vanadium and tungsten into the gauging water of an hydraulic cement composition, said reagent being introduced in quantities of from about 0.5% to 1.0% by weight of such water.

5. As a gauging reagent for use in mixing Portland cement compositions, an aqueous medium containing from about 0.2% to 1.0% by weight of chromic anhydride dissolved therein.

6. An hydraulic cement composition comprising hydraulic cement and the products of reaction between a water solution of chromic anhydride and soluble alkaline earth constituents of said cement.

7. An hydraulic cement composition comprising hydraulic cement, aggregate and relatively insoluble products of reaction between a water solution of chromic anhydride and lime.

8. An hydraulic cement composition containing chromium hydroxide and calcium chromate homogeneously distributed throughout the mass.

9. An hydraulic cement composition including hydraulic cement and the products of reaction between alkaline earth constituents of the cement and a water solution of a reagent from the group consisting of chromic anhydride, molybdic acid, manganese trioxide, and substantially neutral water-soluble salts of molybdenum, manganese, vanadium and tungsten.

10. In a method of preparing hydraulic cement compositions having high resistance to penetration by water and higher compressive strength than normal comparable hydraulic cement compositions, the step of: adding chromic acid to the gauging water of an hydraulic cement composition, said chromic acid being introduced in quantities of from about 0.5% to 1.0% by weight of such water.

11. In a method of rendering innocuous the available lime content of hydraulic cements, the step of converting readily soluble lime components of hydraulic cement into relatively insoluble metallic compounds by introducing a water-soluble reagent from the group consisting of chromic anhydride, manganese trioxide, molybdic acid and substantially neutral water-soluble salts of molybdenum, tungsten, manganese and vanadium into the gauging water used in mixing hydraulic cement compositions in the proportion of from about 0.2% to 1.0% of such reagent by weight of the gauging water.

12. In a method of producing hydraulic cement compositions, the step of introducing a water-soluble reagent from the group consisting of chromic anhydride, manganese trioxide, molybdic acid and substantially neutral water-soluble ammonium salts of molybdenum, manganese, vanadium and tungsten into the gauging water of an hydraulic cement composition, such reagent being introduced in quantities of from about 0.2% to 1.0% by weight of such water.

CALVIN A. OWENS.